(12) United States Patent
Choi et al.

(10) Patent No.: US 7,688,666 B2
(45) Date of Patent: Mar. 30, 2010

(54) MEMORY SYSTEM FOR CONTROLLING POWER AND METHOD THEREOF

(75) Inventors: Joo-Sun Choi, Yongin-si (KR); Hoe-Ju Chung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 266 days.

(21) Appl. No.: 11/896,123

(22) Filed: Aug. 29, 2007

(65) Prior Publication Data

US 2008/0059822 A1    Mar. 6, 2008

(30) Foreign Application Priority Data

Aug. 30, 2006   (KR) ...................... 10-2006-0082619

(51) Int. Cl.
*G11C 5/14*    (2006.01)

(52) U.S. Cl. .................. 365/226; 365/227; 365/189.12; 713/320

(58) Field of Classification Search ................. 365/226, 365/227, 189.12, 233.13; 713/320, 324
See application file for complete search history.

(56) References Cited

U.S. PATENT DOCUMENTS

| | | | |
|---|---|---|---|
| 6,507,530 B1 | 1/2003 | Williams et al. | |
| 6,564,328 B1 | 5/2003 | Grochowski et al. | |
| 6,826,704 B1 | 11/2004 | Pickett | |
| 7,219,248 B2 * | 5/2007 | Shikata | 713/323 |
| 7,352,641 B1 * | 4/2008 | Wu | 365/211 |
| 7,394,687 B2 * | 7/2008 | Bertin et al. | 365/185.08 |

FOREIGN PATENT DOCUMENTS

| | | |
|---|---|---|
| KR | 2001-0100624 | 11/2001 |
| KR | 2002-0062986 | 7/2002 |
| KR | 2003-0082963 | 10/2003 |

* cited by examiner

*Primary Examiner*—Anh Phung
*Assistant Examiner*—Toan Le
(74) *Attorney, Agent, or Firm*—Lee & Morse, P.C.

(57) ABSTRACT

Example embodiments relate to a memory system and a method of controlling power thereof. The memory system may include a memory device and a memory controller. The memory device may be configured to be set to a specific power characteristic mode in response to a mode register set command so as to provide a power characteristic information corresponding to the specific power characteristic mode. The memory controller may be configured to provide the mode register set command to the memory device, configured to read the power characteristic information corresponding to the specific power characteristic mode from the memory device, configured to generate a power control information based on the power characteristic information, configured generate a command in response to the power control information, and provide the command to the memory device according to the power control information.

19 Claims, 11 Drawing Sheets

FIG. 2

| OPERATION CURRENT(mA) | WEIGHT VALUE |
|---|---|
| ~100mA | 1 |
| 100~200mA | 2 |
| 200~300mA | 3 |
| 300~400mA | 4 |
| 400~500mA | 5 |
| 500~600mA | 6 |
| 600~700mA | 7 |
| 700~800mA | 8 |
| 800~900mA | 9 |
| 900mA ~ | 10 |

FIG. 3

SPEED BIN

| $E_2$ | $E_1$ | $E_0$ | SPEED BIN |
|---|---|---|---|
| 0 | 0 | 0 | -25 |
| 0 | 0 | 1 | -2A |
| 0 | 1 | 0 | -33 |
| 0 | 1 | 1 | -36 |
| 1 | 0 | 0 | RESERVED |
| 1 | 0 | 1 | RESERVED |
| 1 | 1 | 0 | RESERVED |
| 1 | 1 | 1 | RESERVED |

FIG. 4

| SPEED | -25 | -2A | -33 | -36 | UNITS |
|---|---|---|---|---|---|
| Bin(CL-tRCD-tRP) | 6-6-6 | 5-5-5 | 5-5-5 | 4-5-5 | |
| PARAMETER | MIN | MIN | MIN | MIN | |
| CAS LATENCY | 6 | 5 | 5 | 4 | tCK |
| tCK | 2.5 | 2.86 | 3.3 | 3.6 | ns |
| tRCD | 6 | 5 | 5 | 5 | tCK |
| tRP | 6 | 5 | 5 | 5 | tCK |
| tRC | 22 | 18 | 18 | 16 | tCK |
| tRAS | 16 | 13 | 13 | 11 | tCK |

FIG. 5

| SYMBOL | SPEED BIN | | | | |
|---|---|---|---|---|---|
| | -25 | | -2A | -33 | -36 |
| IDD0 | | | 85 | | |
| IDD1 | | | 100 | | |
| IDD2P | | | 8 | | |
| IDD2Q | | | 35 | | |
| IDD2N | | | 40 | | |
| IDD3P-F | | | 30 | | |
| IDD3P-S | | | 12 | | |
| IDD3N | | | 55 | | |
| IDD4W | | | 130 | | |
| IDD4R | | | 135 | | |
| IDD5B | | | 150 | | |
| IDD6 NOMAL | | | 8 | | |
| IDD7 | | | 220 | | |

FIG. 6

| SYMBOL | -20 PEAK LATENCY | -20 BROADNESS | -22 PEAK LATENCY | -22 BROADNESS | -25 PEAK LATENCY | -25 BROADNESS | -30 PEAK LATENCY | -30 BROADNESS | -35 PEAK LATENCY | -35 BROADNESS |
|---|---|---|---|---|---|---|---|---|---|---|
| IDD0 | 2 | 4 | | | | | | | | |
| IDD1 | | | | | | | | | | |
| IDD2P | | | | | | | | | | |
| IDD2Q | | | | | | | | | | |
| IDD2N | | | 3 | 2 | | | | | | |
| IDD3P-F | | | | | | | | | | |
| IDD3P-S | | | | | | | | | | |
| IDD3N | | | 4 | 3 | | | | | | |
| IDD4W | | | 2 | 2 | | | | | | |
| IDD4R | | | 3 | 4 | | | | | | |
| IDD5B | | | | | | | | | | |
| IDD6 | | | | | | | | | | |
| IDD7 | | | | | | | | | | |

FIG. 11

| BANK | SPEED | TIMING PATTERNS |
|---|---|---|
| 4 | DDR2-400 4/4/4 | A0 RA0 A1 RA1 A2 RA2 A3 RA3 DDDDD |
| | DDR2-533 3/3/3 | A0 RA0 A1 RA1 A2 RA2 A3 RA3 DDDD |
| X4 X8 X16 | DDR2-533 5/4/4 | A0 RA0 D A1 RA1 D A2 RA2 D A3 RA3 DDDDD |
| | DDR2-533 4/4/4 | A0 RA0 D A1 RA1 D A2 RA2 D A3 RA3 DDDDD |
| 8 X4 X8 | DDR2-400 ALL BINS | A0 RA0 A1 RA1 A2 RA2 A3 RA3 DD |
| 8 X16 | DDR2-400 ALL BINS | A0 RA0 A1 RA1 A2 RA2 A3 RA3 DD |
| | DDR2-533 ALL BINS | A0 RA0 D A1 RA1 D A2 RA2 D A3 RA3 DDD |

MEMORY SYSTEM FOR CONTROLLING POWER AND METHOD THEREOF

BACKGROUND OF THE INVENTION

1. Field of the Invention

Example embodiments relate to a memory system for controlling power, and method thereof. More particular, example embodiments may relate to a memory system and a method of adaptive power throttling according to a power characteristic of a memory device.

2. Description of the Related Art

Recently, as data transmission speed of a processor increases over a short period of time, e.g., several GHz, a memory device having mass storage and high speed may be required. In addition, power consumption may increase as the speed of the memory device increases. Therefore, the power consumption of the memory device may have to be considered when designing the memory system. Further, other power consumption factors, such as, a battery life of portable applications, a cooling device of desk tops, and a power design of a server field, may have to be considered when designing the memory system.

The power consumption of a double data rate synchronous dynamic random access memory (DDR SDRAM) may generally be lower than that of other memory devices. A data manual for the DDR SDRAM may provide operation currents according to each command. For instance, in the DDR SDRAM, when a successive bank access operation is performed according to a multi-bank access method, a high active operation current may flow in a continuous manner. Accordingly, joint electron device engineering council (JEDEC) standards may specify that the bank access operation may not be successively performed more than four times.

A conventional memory controller may generate a power weight value based on a command type. A power count of memory ranks may be increased based on the power weight value generated from the memory controller, and then the power count of the memory ranks may be compared with a threshold value that may be set for the memory ranks. The memory controller may throttle the power of the memory ranks, such that the power count may not exceed the threshold value, e.g., the power consumption may be decentralized by controlling generation time of the command that may be generated from the memory controller.

However, in the conventional power throttling scheme, a power characteristic of the memory device may not reflect the power throttling because the power consumption may be controlled by counting the power weight value of the command, which may be applied to the memory ranks from the memory controller.

Further, because the power characteristic of the memory device may be determined by a system designer by consulting the power characteristic of the memory device, which may be obtain through manual written data, the design may be tedious, troublesome and complicated.

SUMMARY OF THE INVENTION

Example embodiments are therefore directed to power control in a memory system, and method thereof, which substantially overcome one or more of the problems due to the limitations and disadvantages of the related art.

It is therefore a feature of example embodiments to provide a method of controlling power according to a power characteristic of a memory device.

It is therefore another feature of example embodiments to provide a memory system suitable for adaptive power throttling according to a power characteristic of a memory device.

At least one of the above and other features of example embodiments may be to provide a method of controlling power in a memory system. The method may include setting a memory device to a specific power characteristic mode in response to a mode register set command, reading a power characteristic information corresponding to the specific power characteristic mode from the memory device, generating a power control information based on the power characteristic information that may be read from the memory device, and generating a command in response to the power control information so that a power consumption threshold of the memory device is not exceeded.

The power characteristic information may correspond to an operation current information of the command, the operation current information being set based on at least one of a column latency, an additive latency, a row access time and a mode setting information of an operating speed.

The operation current information may include at least one of an operation current value of the command, a current peak latency and a current signal width.

The method may further include computing a power weight value of the command based on the power characteristic information that may be read from the memory device, and generating a space flag of the command in response to the computed power weight value.

The method may further include computing a sum of the weight value of re-arranged commands during a predetermined time interval, so that the computed sum of the weight value does not exceed the power consumption threshold of the memory device.

The method may further include writing a schedule in response to the power control information, and generating the command in order according to the schedule.

The method may further include storing the mode register set command in a mode register of the memory device, and storing a table for the power characteristic information in a power register of the memory device, based on the mode register set command. The table for the power characteristic information may include a table for an operation current information of the command and a table for a peak information.

The method may further include reading a set current value and a peak information of an operation speed from the memory device. The read value of the operation current is stored in an operation current register of the memory controller, and the peak information is stored in a peak information register of the memory controller.

At least one of the above and other features of example embodiments may be to provide a memory system. The memory system may include a memory device configured to be set to a specific power characteristic mode in response to a mode register set command so as to provide a power characteristic information corresponding to the specific power characteristic mode, and a memory controller configured to provide the mode register set command to the memory device, configured to read the power characteristic information corresponding to the specific power characteristic mode from the memory device, configured to generate a power control information based on the power characteristic information that is read from the memory device, configured to generate a command in response to the power control information, and configured to provide the command to the memory device according to the power control information.

The memory device may include a mode register configured to store a mode setting information a power register configured to store a table for the power characteristic information that is based on the mode setting information, and an interface unit configured to provide the specific power characteristic information in response to a demand command of the power characteristic information.

The table for the power characteristic information may include a table for an operation current information of the command and a table for a peak information.

The memory controller may include a mode set control unit configured to provide the mode register set command to the memory device, a power register configured to store the read power characteristic information that is read from the memory device, a power control information generating unit configured to generate the power control information of the command in response to the power characteristic information that is stored in the power register, a command scheduler configured to write a schedule for generating the command in response to the power control information such that a power consumption threshold of the memory device is not exceeded, and a command generating unit configured to generate the command in response to the schedule for generating the command to provide the command to the memory device.

The power characteristic information includes an operation current information of the command and a peak information.

The power control information generating unit may include a power weight value computing unit configured to compute a power weight value of the command based on the power characteristic information that is read from the memory device, and a space flag generating unit configured to generate a space flag of the command in response to the computed power weight value.

At least one of the above and other features of example embodiments may be to provide a memory device, having a mode register configured to store a mode setting information including an operation speed information, a power register configured to store a table of an operation current information of a command, the operation current information being specified based on the set operation speed, and an interface unit configured to provide the specific power characteristic information in response to a demand command of the power characteristic information.

At least one of the above and other features of example embodiments may be to provide a memory system, having a mode set control unit configured to provide a mode register set command to a memory device, a power register configured to store a power characteristic information that is read from the memory device, a power control information generating unit configured to generate the power control information of a command in response to the power characteristic information that is stored in the power register, a command scheduler configured to write a schedule for generating the command in response to the power control information such that a power consumption threshold of the memory device is not exceeded, and a command generating unit configured to generate the command in response to the schedule for generating the command to provide the command to the memory device.

BRIEF DESCRIPTION OF THE DRAWINGS

The above and other features and advantages of example embodiments will become more apparent to those of ordinary skill in the art by describing in detail example embodiments thereof with reference to the attached drawings, in which:

FIG. 2 illustrates a table of a weight value of an operation current according to a command applied to a memory device;

FIG. 3 illustrates a table of a mode register set information according to an operation speed;

FIG. 4 illustrates a table of values of parameters of a memory device according to an operation speed;

FIG. 5 illustrates a table of an operation current information of the command;

FIG. 6 illustrates a table of a time space flag;

FIG. 11 illustrates a diagram of a timing pattern of a command in a multi-bank device, which may be represented in a JEDEC standard;

DETAILED DESCRIPTION OF THE INVENTION

Korean Patent Application No. 10-2006-0082619, filed on Aug. 30, 2006, in the Korean Intellectual Property Office, and entitled: "Method of Power Throttling and Memory System with Power Throttling Scheme," is incorporated by reference herein in its entirety.

Example embodiments will now be described more fully hereinafter with reference to the accompanying drawings. The invention may, however, be embodied in different forms and should not be construed as limited to the embodiments set forth herein. Rather, these example embodiments are provided so that this disclosure will be thorough and complete, and will fully convey the scope of the invention to those skilled in the art.

Figure 1:
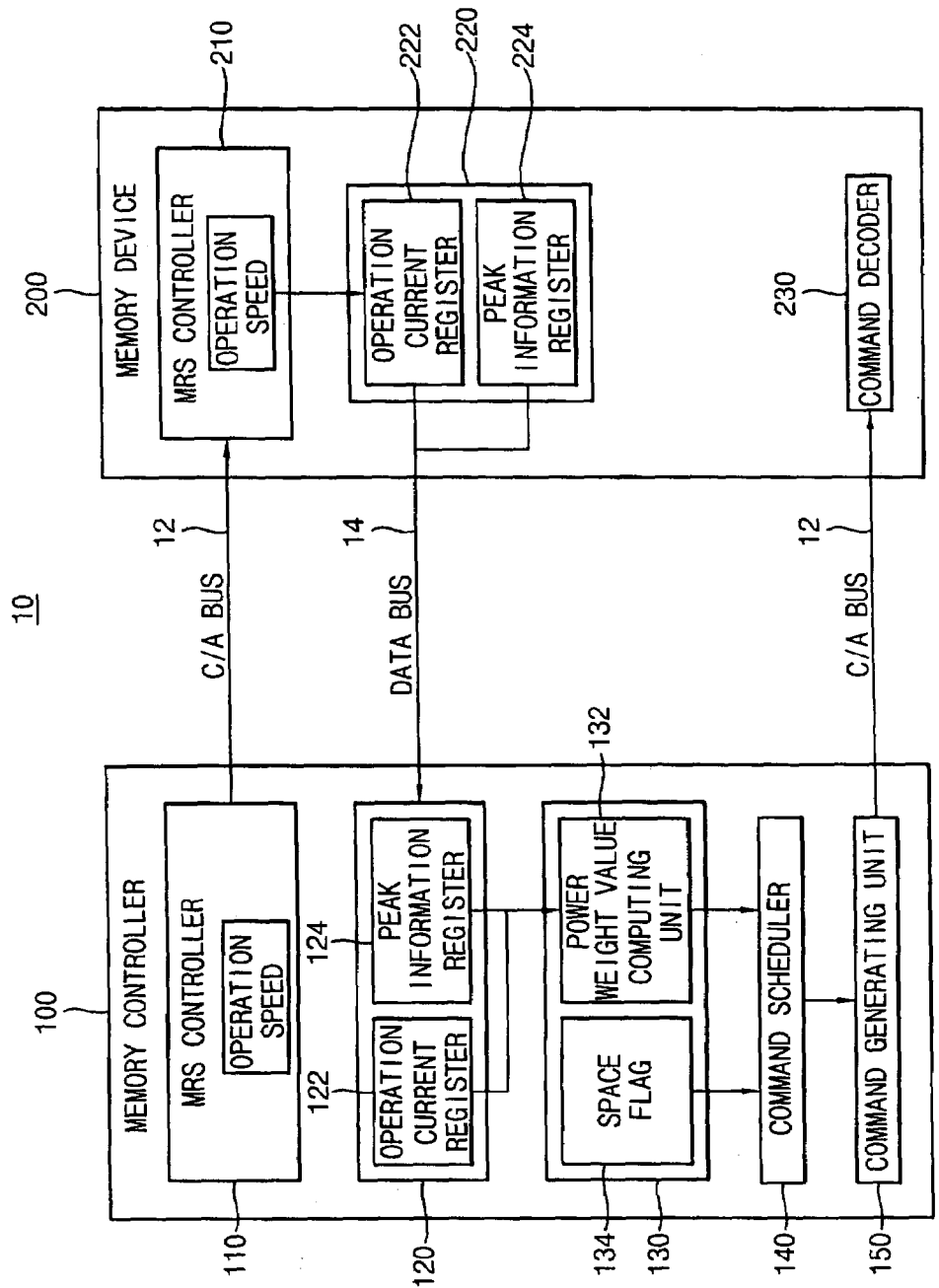
FIG. 1 illustrates a block diagram of a memory system according to an example embodiment.

FIG. 1 illustrates a block diagram of a memory system 10 according to an example embodiment.

Referring to FIG. 1, the memory system 10 may include a memory controller 100 and a memory device 200. The memory controller 100 and the memory device 200 may be connected through at least one command/address bus 12 and at least one data bus 14. It should be appreciated that the memory controller 100 and the memory device 200 may be connected via other buses.

The memory controller 100 may include a mode set control unit 110, a power register 120, a power control information generating unit 130; a command scheduler 140, and a command generating unit 150.

The mode set control unit 110 may generate a mode register set (MRS) command in accordance with various information, such as, but not limited to, a column latency CL, an additive latency AL, a row access time tRAS, and an operating speed SPEED BIN of the memory device 200. It should be appreciated that other information may be generated by the mode set control unit 110. The mode set control unit 110 may further provide the MRS command to the memory device 200.

The power register 120 may store the power characteristic information, which may be read from the memory device 200. The power register 120 may include an operation current register 122 and a peak information register 124. The operation current register 122 may store an operation current information of the memory device 200. The peak information register 124 may store a peak information of the operation current. The operation current information may include a current information and a value of the operation current, which may be related to a command operation of the memory device 200. The peak information may include a peak latency and a signal width.

In an example DDR2 SDRAM device, the operation current according to the command may be as follows:
1. IDD0—operating one bank active-precharge current;
2. IDD1—operating one bank active-read-precharge current;
3. IDD2P—precharge power-down current (all banks idle);
4. IDD2Q—precharge quiet standby current (all banks idle);
5. IDD2N—precharge standby current (all banks idle);
6. IDD3P—active power-down current (all banks open);
7. IDD3N—active standby current (all banks open);
8. IDD4W—operating burst write current (all banks open, continuous burst writes);
9. IDD4R—operating burst read current (all banks open, continuous burst reads);
10. IDD5B—burst auto refresh current;
11. IDD6—self refresh current; and
12. IDD7—operating bank interleave read current (all bank interleaving reads).

The power control information generating unit 130 may generate a power control information of the command in response to the power characteristic information, which may be stored in the power register 120. The power control information generating unit 130 may include a power weight value computing unit 132 and a time space flag generating unit 134. The power weight value computing unit 132 may calculate the power weight value of the command in response to the power characteristic information, which may include the operation current information and the peak information of the command.

FIG. 2 illustrates a table of a weight value of the operation current according to the command applied to the memory device 200. As illustrated in FIG. 2, the weight value may be determined according to the operation current that may be related to each of the commands.

The time space flag generating unit 134 may generate the time space flag of the command in response to the computed power weight value. The time space flag may be generated by calculating a time interval of generating the command in response to an information about a generating time of a peak current and a width of the corresponding command.

The command scheduler 140 may determine a generating schedule for the command in response to the power control information, so that a power consumption threshold of the memory device 200 may not be exceeded, e.g., the command scheduler 140 may recombine the commands so that a sum of the weight values of the adjacent commands may not exceed the power consumption threshold of the memory device 200, and may schedule the commands to a command combination in response to the time space flag information, so that a final power consumption may be optimally distributed.

The command generating unit 150 may generate the related commands sequentially in response to the order that may be scheduled by the command scheduler 140, and may provide the generated commands to the memory device 200.

It should be appreciated that the memory device 200 may be a DDR SDRAM that may include a mode register 210, a power register 220, and a command decoder 230 (as shown in FIG. 1). It should further be appreciated that other devices and/or components, such as, but not limited to, a memory cell array, a row decoder, a column decoder, an input/output circuit unit, and an address buffer (which may not be directly related with the memory system 10), may be included.

The mode register 210 may be configured to store a mode setting information including an operating speed (which may be defined in a joint electron device engineering council (JEDEC) standard). In other words, the mode register 210 may store information regarding MRS modes (MRS, MRS(1), MRS(2), MRS(3)), a power down, a test mode, a dynamic link library (DLL) reset, a column latency, a burst type, an off chip driver calibration (OCD) adjusting program, a terminal resistance, a data strobe signal (DQS), a redundant DQS (RDQS), an additive latency, a DLL, an output driver, and an impedance control, etc. It should be appreciated that other information may be stored by the mode register 210.

Further, because the operation current may be different according to the operation speed of a chip, the operation speed may be additionally included in the MRS contents of an extended MRS, e.g., EMRS(2) or EMRS(3).

The power register 220 may store the power control information that may be specified according to the operation speed, and may include the operation current information table 222 of the command and the peak information table 224.

FIG. 3 illustrates a table of a mode register set information according to an operation speed. Referring to FIG. 3, values of the operation speed SPEED BIN (e.g., −25, −2A, −33, −36) may be set by combining address bits (e.g., E2, E1, E0).

FIG. 4 illustrates a table of minimum values of parameters of the memory device 200 according to an operation speed. The SPEED BIN is defined as a column address select (CAS) latency (CL), a row column delay time (tRCD), and a row address select latency (tRP). Other parameters may include an application clock period (tCK), a row address select time (tRAS), and an RAS cycle time (tRC). Note that the application clock period tCK may be given in nano seconds, while the remaining parameters may be given in units of the application clock period tCK.

FIG. 5 illustrates a table of the operation current information of the command. The operation current information table may be composed of the values of the operation current according to the operation speed. The operation speed may have a variance, as compared with the operation speed of the design, due to a process variance of manufacturing the memory device 200. Therefore, the values of the operation current according to the operation speed may be determined and written to a table, so that the suitable value of the operation current may be provided by setting the operation speed.

FIG. 6 illustrates a table for providing a time space flag. Referring to FIG. 6, the peak information to be written in the table may include a peak latency and a broadness. The peak latency may represent a number of clocks being delayed from the location of a current peak. The broadness may represent a number of clocks corresponding to a signal width at the current peak.

Figure 7:
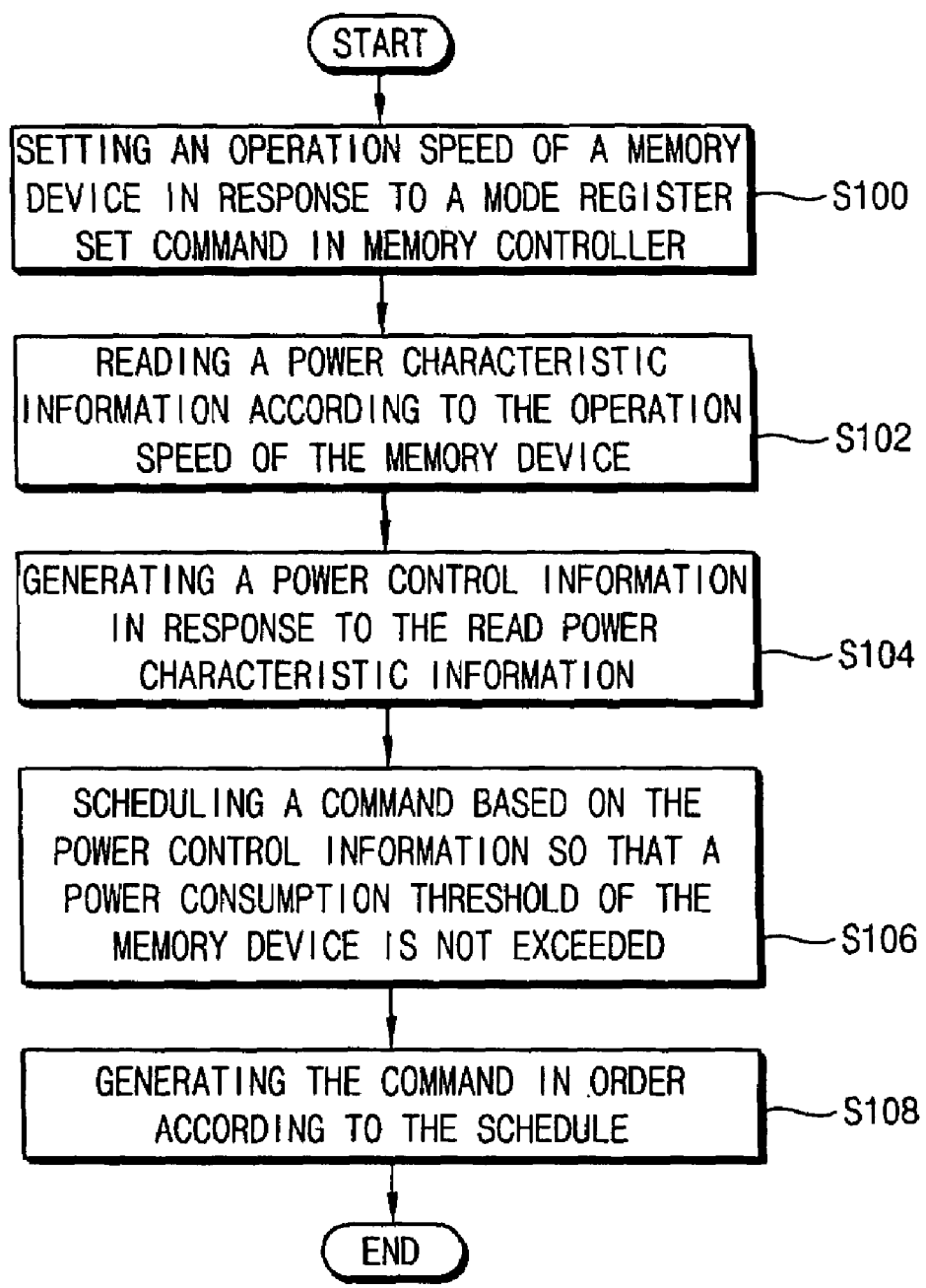
FIG. 7 illustrates a flowchart of a method of power throttling of a memory system according to an example embodiment.

FIG. 7 illustrates a flowchart of a method of power throttling the memory system 10 according to an example embodiment. It should be appreciated that the method of FIG. 7 may be programmed into a logic circuit in a memory controller 100.

Referring to FIGS. 1 and 7, the memory controller 100 may provide a MRS command to the memory device 200. The memory device 200 may be set to a specific power characteristic mode, e.g., an operation speed, a column latency, an additive latency, and a row access time, and may be set to specific values (S100). The memory device 200 may then be set to the specific operation speed according to the MRS information (as shown in FIG. 3).

The memory device 200 may be set to a specific MRS mode in response to the MRS command, and simultaneously, the memory device 200 may set a current value of the operation speed and peak information, which may be set in the operation current information table 222 and the peak information table 224, respectively.

The memory controller 100 may read the set current value and the peak information of the operation speed from the memory device 200 (S102). The read value of the operation current may be stored in the operation current register 122 of the memory controller 100. The peak information may be stored in the peak information register 124 of the memory controller 100.

The command computing unit 132 in the power control information generating unit 130 may calculate the power weight value of the command from the power weight value based on the value of operation current, which may be stored in the operation current register 122. The time space flag generating unit 134 may generate the time space flag in response to the power characteristic information, e.g., the peak information (S104).

The command scheduler 140 may compute the sum of the weight value of the rearranged commands during a determined time interval, and may write a schedule for generating the command, so that the computed sum of the weight value does not exceed the power consumption threshold of the memory device (S106). The commands may then be generated in order according to the schedule (S108).

Figure 8:
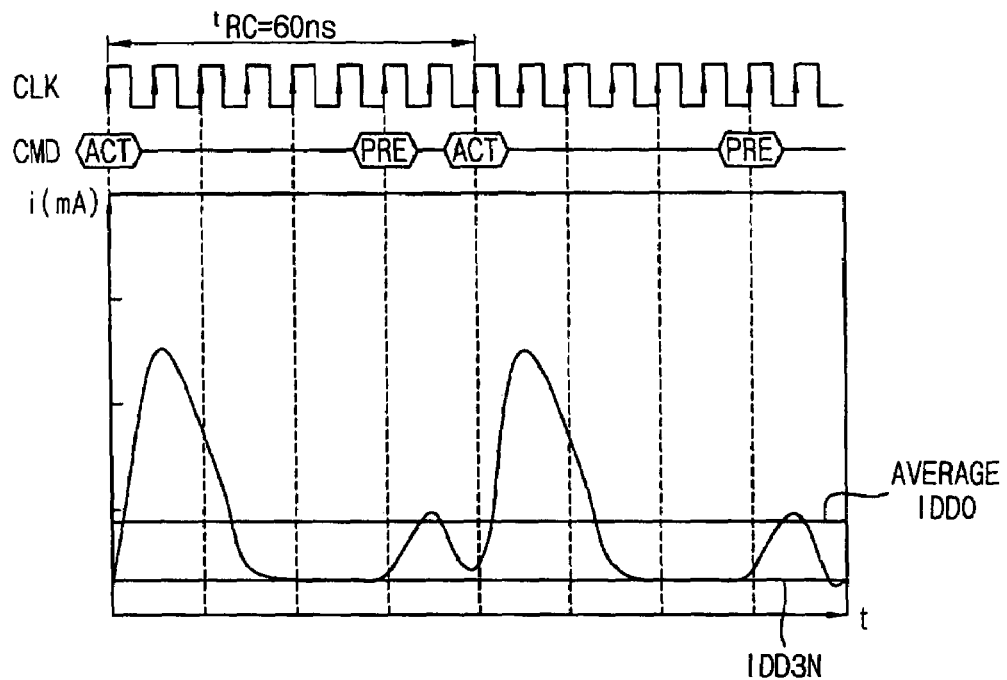
FIG. 8 illustrates a waveform diagram of an operation current that may be related to an active command and a precharge command.

FIG. 8 illustrates a waveform diagram of an operation current IDD0, which may be related to the active command and the precharge command. As illustrated in FIG. 8, when an average current IDD0 is about 105 mA in the active command and the precharge command, an average current IDD3N is about 45 mA in a standby mode. Further, when an operation voltage is about 2.7 V, then the power consumption may be computed as being about (105 mA–45 mA)*2.7 V, which may equate to about 162 mW.

Figure 9:
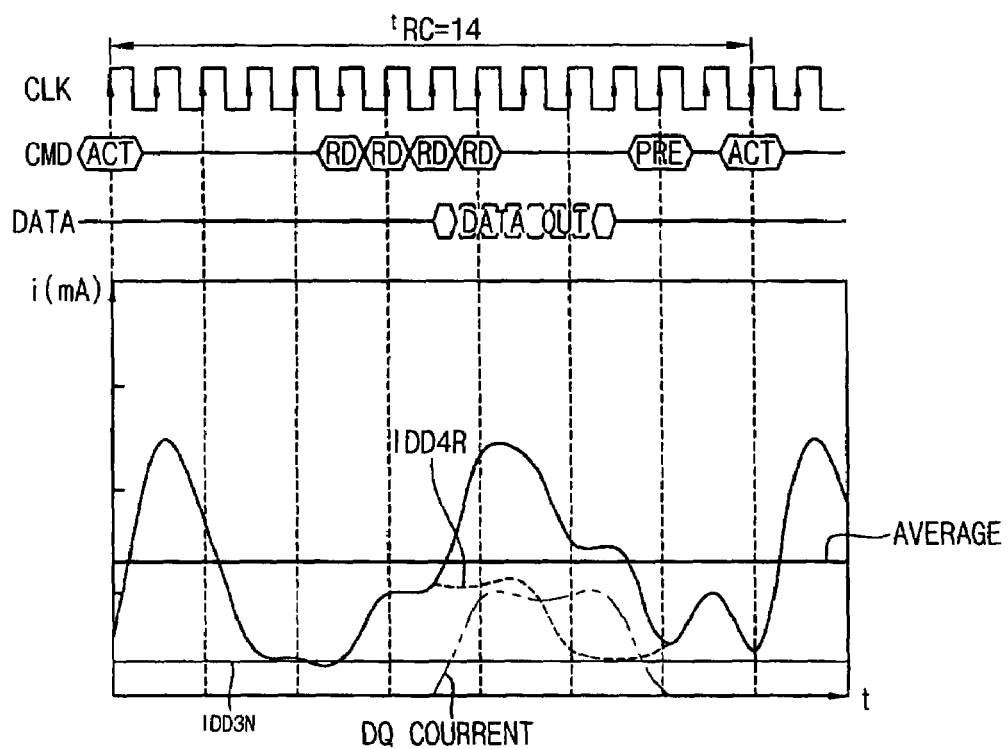
FIG. 9 illustrates a waveform diagram of an operation current in a burst read command with a burst length of four.

FIG. 9 illustrates a waveform diagram of an operation current IDD4R in a burst read command having a burst length of four. Further, when an average current IDD4R is about 110 mA in a read command, an average current is about 45 mA in a standby mode, a read cycle is four clocks, and active clocks are fourteen clocks. Further, when an operation voltage is about 2.7 V, then a power consumption may be computed as being about (110 mA–45 mA)*(4/14)*2.7 V, which may equate to about 50 mW. Further, when a power consumption is 93 mW in an active command, and a power consumption may be 122 mW in a standby mode, then a total power consumption of the burst read operation may be computed as being about (50 mW+93 mW+122 mW), which may equate to about 265 mW.

Figure 10:
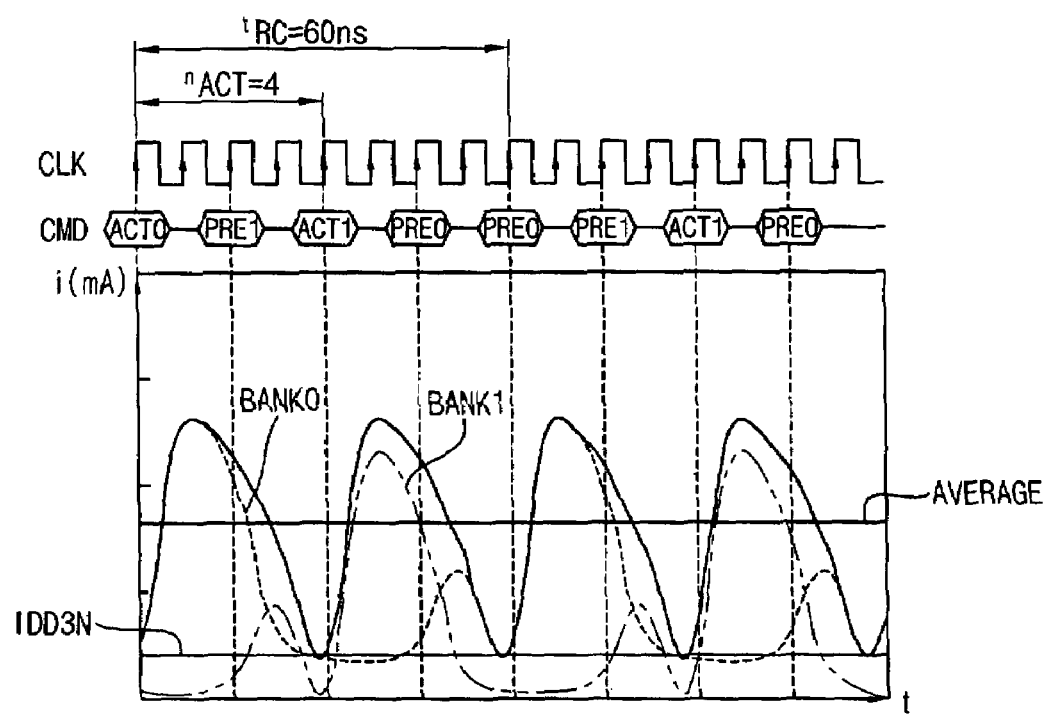
FIG. 10 illustrates a waveform diagram of an operation current when an active command and a precharge command may be generated by an interleave type of four banks.

FIG. 10 illustrates a waveform diagram of an operation current IDD0 when the active command and the precharge command are generated by an interleave type of four banks. In this example embodiment, because a power consumption may be increased to about double (as compared with a case of one bank), the power consumption may be computed as being about 324 mW.

Further, a power consumption, which may correspond to each command, may be computed by an exact operation current information and peak information. Thus, a weight value that may correspond to the computed power consumption may be computed based on the values in the table of FIG. 2.

FIG. 11 illustrates a diagram of a timing pattern of a command in a multi-bank device (which may be represented in a JEDEC standard).

In FIG. 11, AX may refer to an active command, RAX may refer to a read command, and D may refer to a dummy command. Each of the commands AX, RA(X) and D may be generated per one clock cycle, (e.g., at four banks device), a timing pattern of SPEED BIN 3/3/3 may be different from a timing pattern of SPEED BIN 5/4/4 in a DDR2-533, for example. In other words, because the dummy command D may exist per bank active operation, in case of SPEED BIN 5/4/4, the timing pattern may be determined, such that a concentration of the power consumption may be prevented. In an eight banks device, the timing pattern may be varied according to a number of input/output pins.

Accordingly, an optimal power throttling control may be achieved by adaptively controlling the timing pattern combination of commands depending on the power characteristic of the memory device 200.

Figure 12:
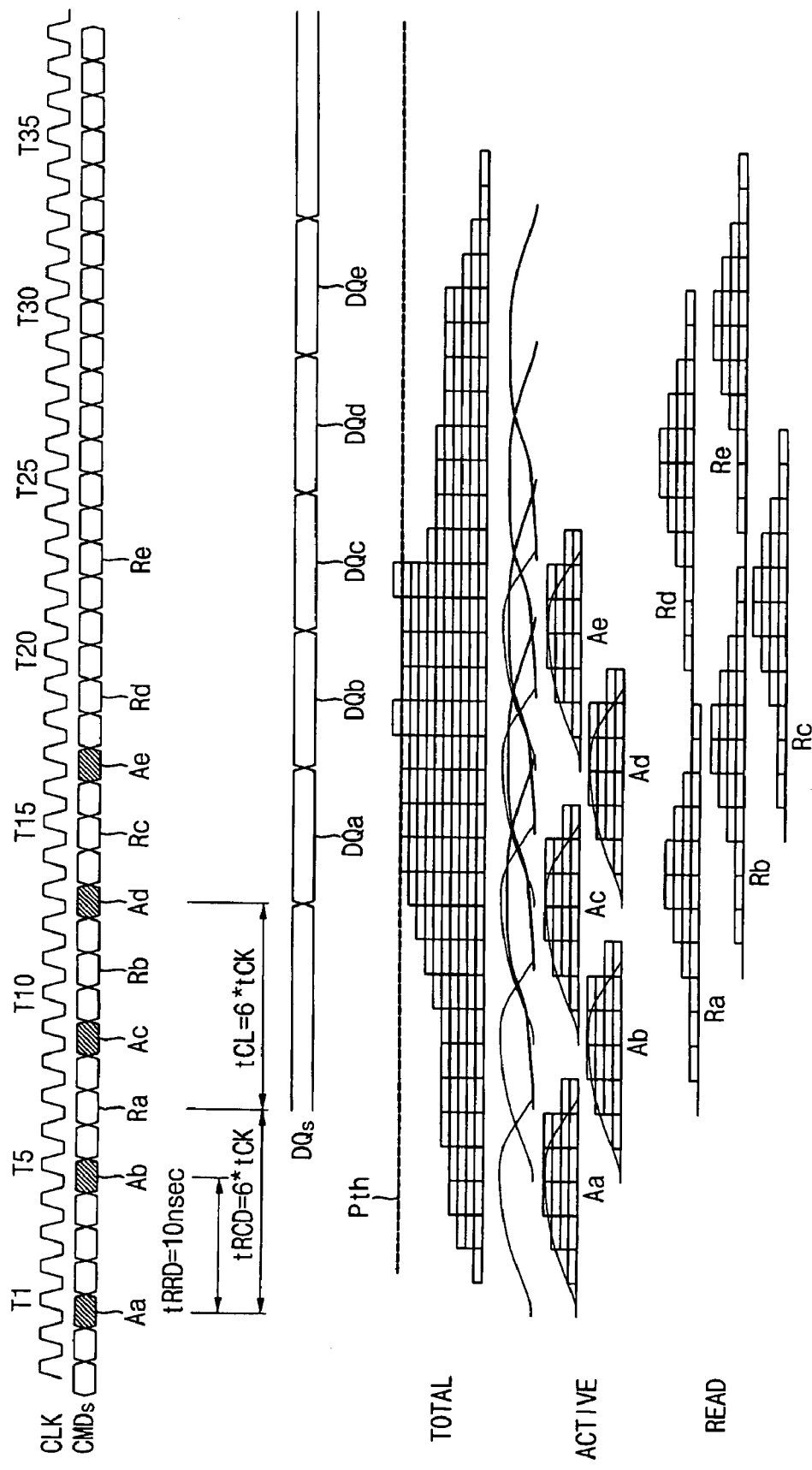
FIG. 12 illustrates a diagram of power waveforms of respective commands and a total power waveform when five active commands and read commands are successively applied.

FIG. 12 illustrates a diagram of power waveforms of respective commands and a total power waveform, when five active commands and read commands are successively applied in a condition that SPEED BIN value corresponds to –25 (i.e., one clock period is 2.5 nsec, CL=6, tRCD=6, and tRP=6) and when a minimum time between active commands AX (tRRD) corresponds to 10 nsec, e.g., 4 clock periods tCK.

In FIG. 12, Aa through Ae may refer to each of the power waveforms in active command; Ra through Re may refer to each of the power waveforms in read command; and T1 through Tn may refer to a number n of clock cycles, wherein a total power waveform at T18 and T22 may be higher than a threshold power Pth.

Figure 13:
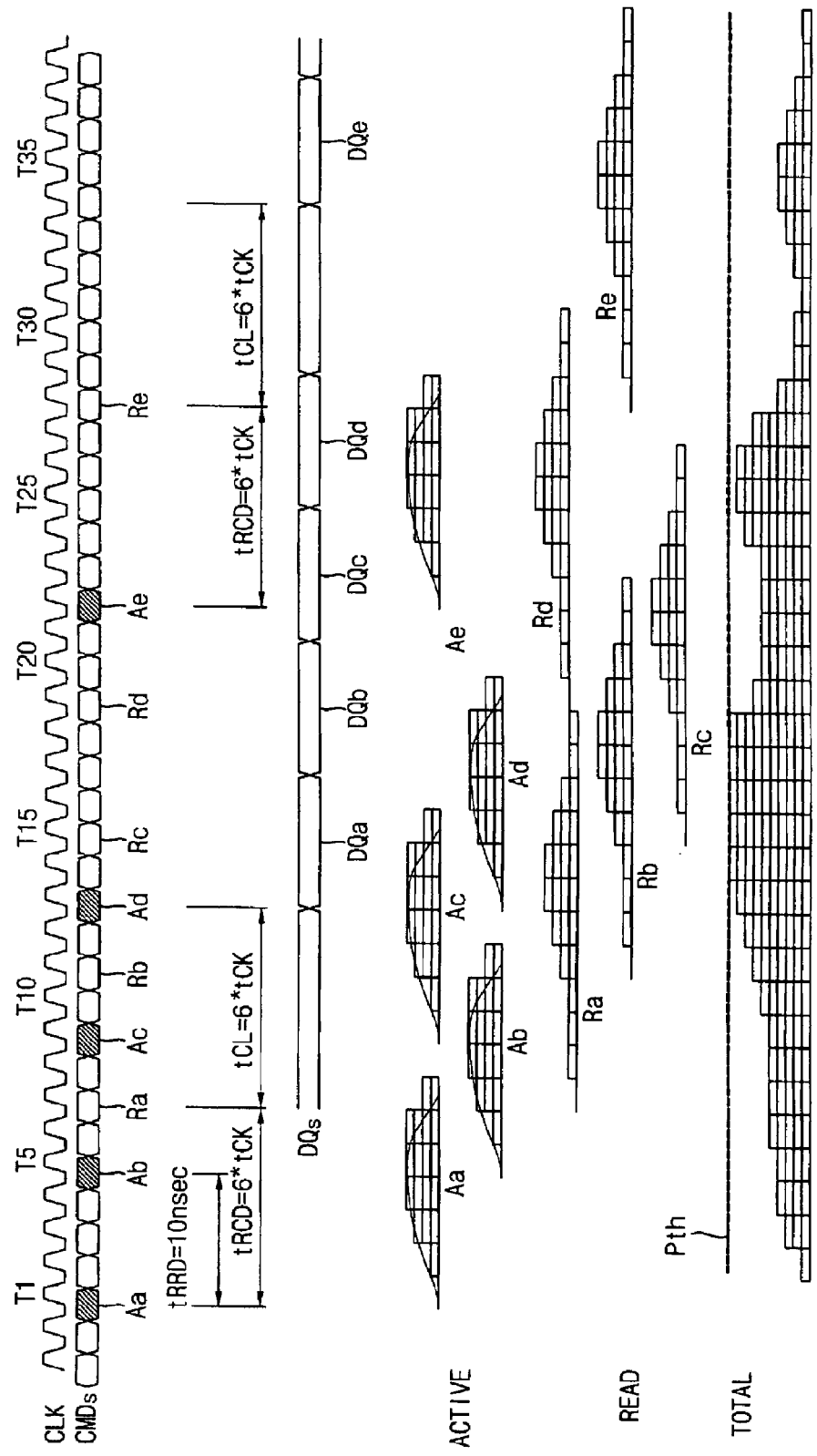
FIG. 13 illustrates a diagram of power waveforms of respective commands and a total power waveform, when the commands are reordered by a command scheduler according to an example embodiment.

FIG. 13 illustrates a diagram of power waveforms of respective commands and a total power waveform, when the commands are re-ordered by the command scheduler 140 according to an example embodiment.

In FIG. 13, Aa through Ae may refer to each of the power waveforms in active command, and Ra through Re may refer to each of the power waveforms in read command. The total power waveform may be controlled to be lower than the threshold power Pth or to be equal to the threshold power Pth, e.g., when the power is higher than the threshold power Pth, the command scheduler 140 may reorder the commands. By the re-ordering the schedule of generating the commands, a fifth active command Ae may not be generated at time T17, but may be generated at delayed time T22. Further, a related read command may be generated at time T28, which may be delayed from time T23. In other words, a timing pattern may be altered to maintain power consumption of the memory device below the threshold power Pth. Therefore, as the total power is dispersed within a range less than the threshold value Pth, malfunction due to concentrated power schedule may be prevented and/or reduced.

In an example embodiment, a power scheme may be optimally controlled by adaptively changing a power throttling according to a power characteristic information of a multi-bank memory device.

In the figures, the dimensions of regions may be exaggerated for clarity of illustration. It will also be understood that when an element is referred to as being "on" another element or substrate, it can be directly on the other element or substrate, or intervening elements may also be present. Further, it will be understood that when a element is referred to as being "under" another element, it can be directly under, and one or more intervening elements may also be present. In addition, it will also be understood that when an element is referred to as being "between" two elements, it can be the only layer between the two elements, or one or more intervening elements may also be present. Like reference numerals refer to like elements throughout.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of controlling power in a memory system, comprising:
   setting a memory device to a specific power characteristic mode in response to a mode register set command;
   reading a power characteristic information corresponding to the specific power characteristic mode from the memory device;
   generating a power control information based on the power characteristic information that is read from the memory device; and
   generating a command in response to the power control information so that a power consumption threshold of the memory device is not exceeded.

2. The method as claimed in claim 1, wherein the power characteristic information corresponds to an operation current information of the command, the operation current information being set based on at least one of a column latency, an additive latency, a row access time and a mode setting information of an operating speed.

3. The method as claimed in claim 2, wherein the operation current information includes at least one of an operation current value of the command, a current peak latency and a current signal width.

4. The method as claimed in claim 1, wherein generating the power control information comprises:
   computing a power weight value of the command based on the power characteristic information that is read from the memory device; and
   generating a space flag of the command in response to the computed power weight value.

5. The method as claimed in claim 4, wherein computing the power weight value of the command comprises:
   computing a sum of the weight value of re-arranged commands during a predetermined time interval, so that the computed sum of the weight value does not exceed the power consumption threshold of the memory device.

6. The method as claimed in claim 1, further comprising:
   writing a schedule in response to the power control information; and
   generating the command in order according to the schedule.

7. The method as claimed in claim 1, further comprising:
   storing the mode register set command in a mode register of the memory device; and
   storing a table for the power characteristic information in a power register of the memory device, based on the mode register set command.

8. The method as claimed in claim 7, wherein the table for the power characteristic information includes a table for an operation current information of the command and a table for a peak information.

9. The method as claimed in claim 1, wherein reading the power characteristic information comprises:
   reading a set current value and a peak information of an operation speed from the memory device.

10. The method as claimed in claim 9, wherein the read value of the operation current is stored in an operation current register of the memory controller, and the peak information is stored in a peak information register of the memory controller.

11. A memory system, comprising:
   a memory device configured to be set to a specific power characteristic mode in response to a mode register set command so as to provide a power characteristic information corresponding to the specific power characteristic mode; and
   a memory controller configured to provide the mode register set command to the memory device, configured to read the power characteristic information corresponding to the specific power characteristic mode from the memory device, configured to generate a power control information based on the power characteristic information that is read from the memory device, configured to generate a command in response to the power control information, and configured to provide the command to the memory device according to the power control information.

12. The memory system as claimed in claim 11, wherein the memory device comprises:
- a mode register configured to store a mode setting information;
- a power register configured to store a table for the power characteristic information that is based on the mode setting information; and
- an interface unit configured to provide the specific power characteristic information in response to a demand command of the power characteristic information.

13. The memory system as claimed in claim 12, wherein the table for the power characteristic information includes a table for an operation current information of the command and a table for a peak information.

14. The memory system as claimed in claim 11, wherein the memory controller comprises:
- a mode set control unit configured to provide the mode register set command to the memory device;
- a power register configured to store the read power characteristic information that is read from the memory device;
- a power control information generating unit configured to generate the power control information of the command in response to the power characteristic information that is stored in the power register;
- a command scheduler configured to write a schedule for generating the command in response to the power control information such that a power consumption threshold of the memory device is not exceeded; and
- a command generating unit configured to generate the command in response to the schedule for generating the command to provide the command to the memory device.

15. The memory system as claimed in claim 14, wherein the power characteristic information corresponds to an operation current information of the command, the operation current information being set based on at least one of a column latency, an additive latency, a row access time and a mode setting information of an operating speed.

16. The memory system as claimed in claim 15, wherein the operation current information includes at least one of an operation current value of the command, a current peak latency and a current signal width.

17. The memory system as claimed in claim 14, wherein the power characteristic information includes an operation current information of the command and a peak information.

18. The memory system claim 17, wherein the power control information generating unit comprises:
- a power weight value computing unit configured to compute a power weight value of the command based on the power characteristic information that is read from the memory device; and
- a space flag generating unit configured to generate a space flag of the command in response to the computed power weight value.

19. A memory controller, comprising:
- a mode set control unit configured to provide a mode register set command to a memory device;
- a power register configured to store a power characteristic information that is read from the memory device;
- a power control information generating unit configured to generate the power control information of a command in response to the power characteristic information that is stored in the power register;
- a command scheduler configured to write a schedule for generating the command in response to the power control information such that a power consumption threshold of the memory device is not exceeded; and
- a command generating unit configured to generate the command in response to the schedule for generating the command to provide the command to the memory device.

* * * * *